United States Patent
Connelly et al.

(10) Patent No.: US 10,260,540 B2
(45) Date of Patent: Apr. 16, 2019

(54) HEAT SHIELD FLANGE SLIDING JOINT

(71) Applicant: The Boeing Company, Chicago, IL (US)

(72) Inventors: Thomas J. Connelly, Bellevue, WA (US); Linda M. Li, Bothell, WA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 15/254,245

(22) Filed: Sep. 1, 2016

(65) Prior Publication Data

US 2018/0057140 A1  Mar. 1, 2018

(51) Int. Cl.
| | |
|---|---|
| *B64C 1/40* | (2006.01) |
| *B64C 3/32* | (2006.01) |
| *B64D 29/02* | (2006.01) |
| *B64D 33/04* | (2006.01) |
| *F16B 5/00* | (2006.01) |
| *F16B 5/02* | (2006.01) |
| *F16B 1/00* | (2006.01) |

(52) U.S. Cl.
CPC ............ *F16B 5/0241* (2013.01); *B64C 1/403* (2013.01); *B64C 3/32* (2013.01); *B64D 29/02* (2013.01); *B64D 33/04* (2013.01); *F16B 5/0088* (2013.01); *F16B 2001/0078* (2013.01); *Y10T 403/217* (2015.01); *Y10T 403/75* (2015.01)

(58) Field of Classification Search
CPC .. B64C 1/38; B64C 1/403; B64C 3/32; B64C 3/36; B64D 29/02; B64D 33/04; F01D 25/243; F02K 1/80; F16B 5/0024; F16B 5/0088; F16B 5/024; F16B 5/04; F16B 2001/0078; F16B 5/0241; Y10T 403/21; Y10T 403/213; Y10T 403/217; Y10T 403/33; Y10T 403/335; Y10T 403/645; Y10T 403/75
USPC ................. 403/28–30, 167, 168, 337, 408.1; 415/213.1
See application file for complete search history.

(56) References Cited

U.S. PATENT DOCUMENTS

| | | | |
|---|---|---|---|
| 4,907,743 A | | 3/1990 | Bouiller et al. |
| 5,369,952 A | * | 12/1994 | Walters .................... F02C 7/222 |
| 5,622,438 A | | 4/1997 | Walsh et al. |

(Continued)

FOREIGN PATENT DOCUMENTS

| | | | | |
|---|---|---|---|---|
| DE | 202013004139 U1 | * | 8/2014 | ............ F16B 5/0241 |
| JP | 2006104962 A | | 4/2006 | |

OTHER PUBLICATIONS

Search Report for related European Application No. EP17188596.5; report dated Nov. 29, 2017.

*Primary Examiner* — Josh Skroupa
(74) *Attorney, Agent, or Firm* — Miller, Matthias & Hull LLP

(57) ABSTRACT

A thermal expansion includes a bottom portion extending between a support structure and a trailing edge, and the support structure is positioned proximate to a heat source. Furthermore, the thermal expansion joint includes a side portion. In some embodiments, the thermal expansion joint includes an overlapping portion coupled to the bottom portion and extending from a flange portion towards the side portion. Moreover, the overlapping portion overlays and is biased against the side portion to enable thermal expansion during heating by extending towards the flange portion and sliding along a top surface of the side portion.

17 Claims, 8 Drawing Sheets

(56) References Cited

U.S. PATENT DOCUMENTS

| | | | |
|---|---|---|---|
| 6,065,756 A | 5/2000 | Eignor et al. | |
| 6,829,883 B2 * | 12/2004 | Sathianathan | F01D 25/243 |
| | | | 403/150 |
| 7,121,758 B2 * | 10/2006 | McMillan | F01D 21/045 |
| | | | 403/408.1 |
| 7,581,301 B2 * | 9/2009 | Arbona | B62D 29/048 |
| | | | 29/525.02 |
| 7,584,582 B1 * | 9/2009 | Hutter, III | B64C 1/403 |
| | | | 156/91 |
| 8,118,252 B2 * | 2/2012 | Dumont | B64D 33/04 |
| | | | 244/130 |
| 10,011,365 B2 * | 7/2018 | Shephard | B64D 29/02 |

* cited by examiner

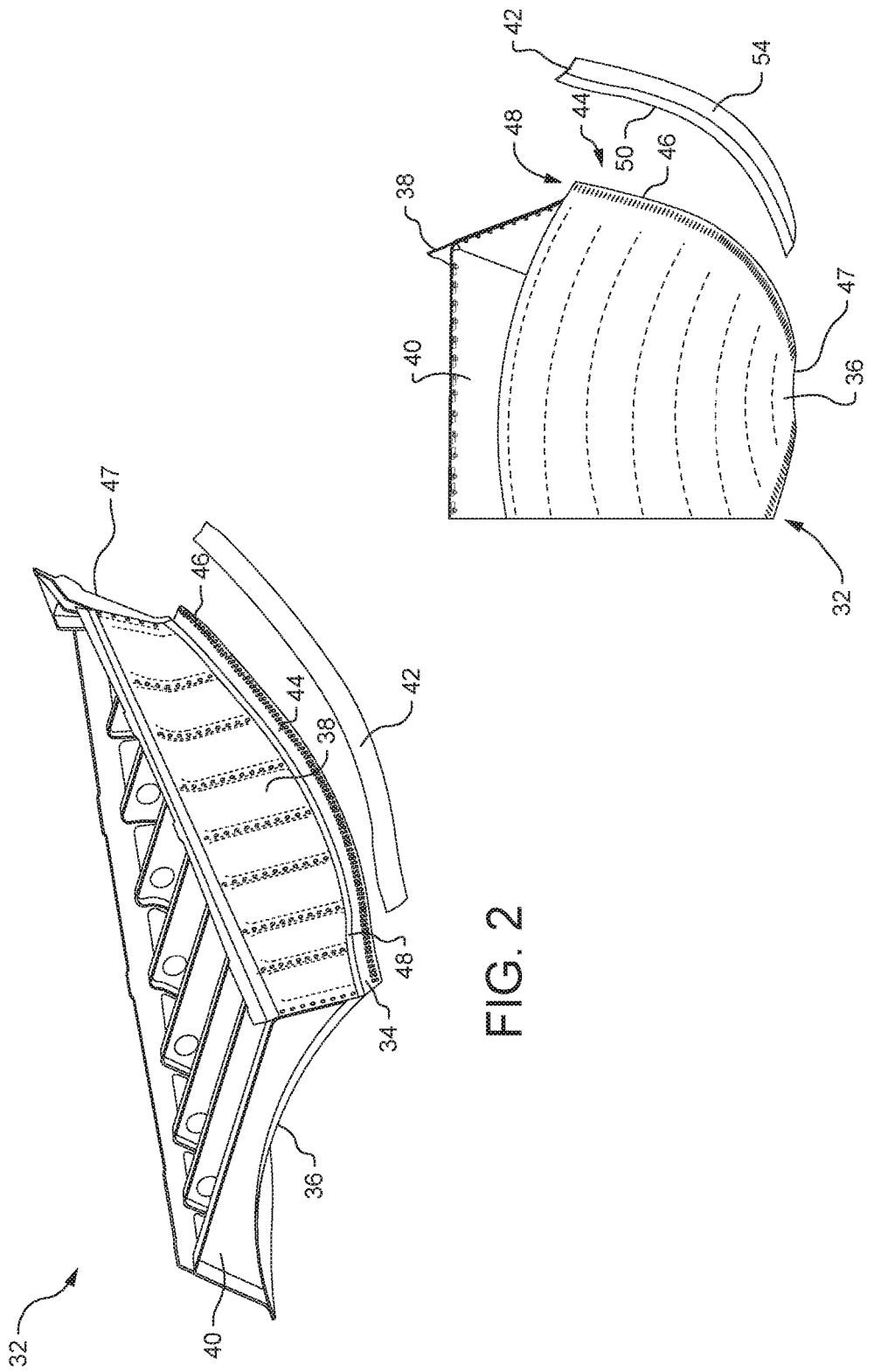

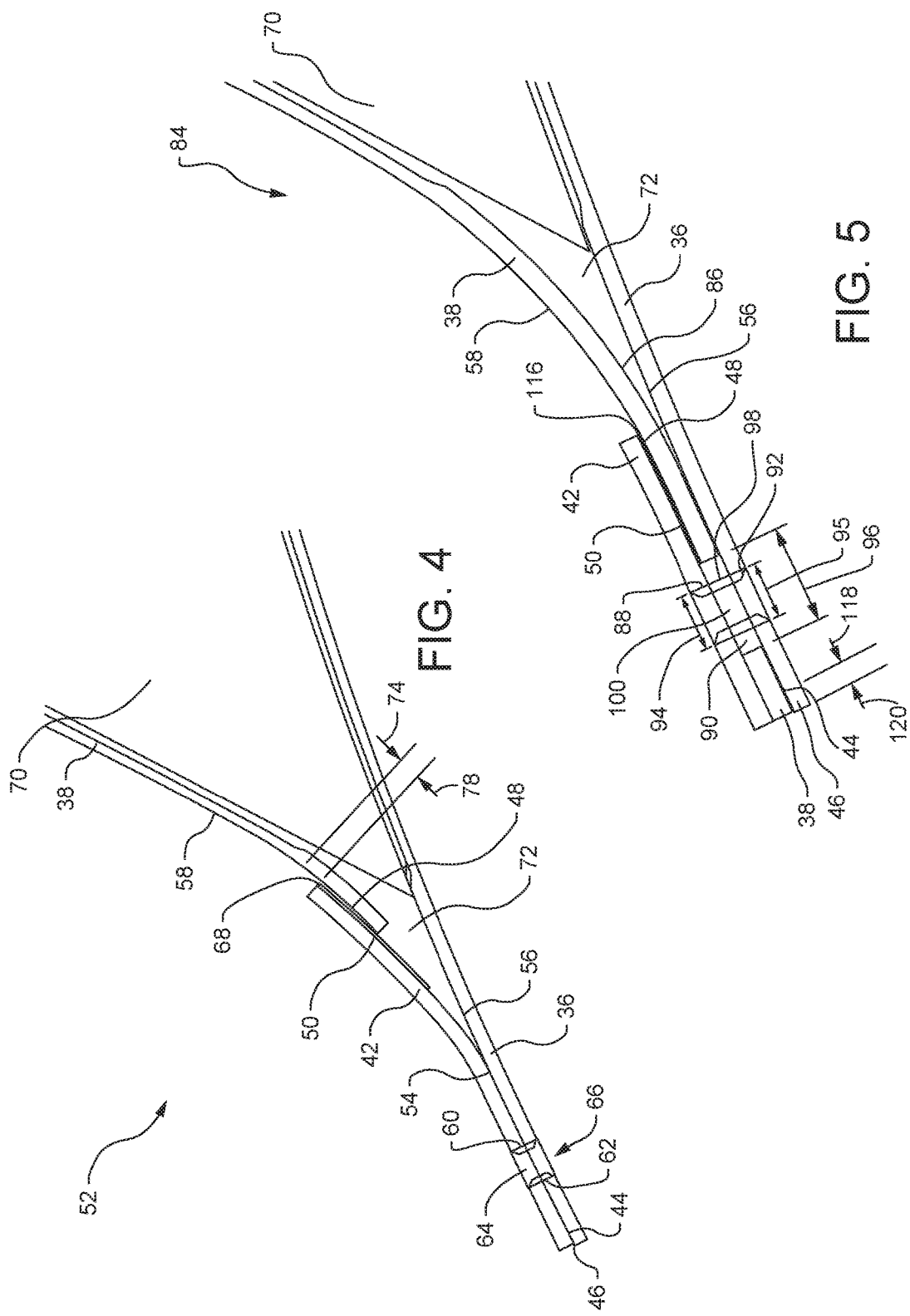

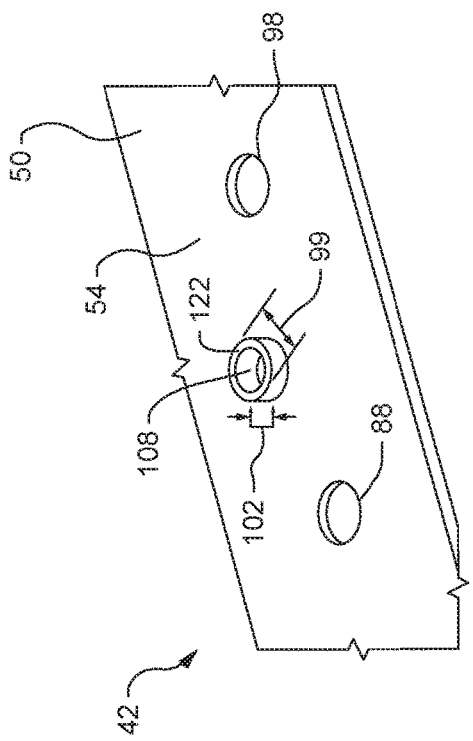
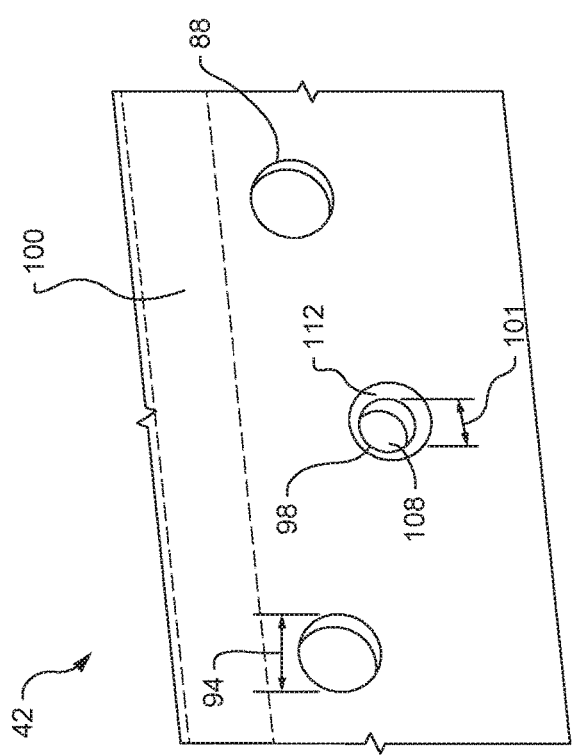

HEAT SHIELD FLANGE SLIDING JOINT

FIELD

The present disclosure relates generally to heat shields, and more specifically to an expansion joint associated with aircraft heat shields.

BACKGROUND

Components of vehicles and machines, such as aircraft, are designed to tolerate a variety of harsh operational conditions. In some cases, aircraft are exposed to varying temperature conditions, and as a result many aircraft components are designed to function across a broad temperature range. For example, heat shields and other temperature protective devices are incorporated into the aircraft outer structure to protect sensitive internal systems and components against high temperatures. Furthermore, heat shields located near a heat source, such as an aircraft engine, are often designed with one or more expansion joints which allow the heat shield to expand and contract with the varying temperature conditions. In some cases, the close proximity to the engine requires the heat shield to be capable of withstanding very high temperatures, as well being able to undergo a large number of thermal expansion/contraction cycles. Therefore, a heat shield is needed with a thermal expansion joint which is capable of withstanding multiple thermal expansion and contraction cycles while maintaining its protection of the internal aircraft systems and components.

SUMMARY

In accordance with one aspect of the present disclosure, a thermal expansion joint is disclosed. In one non-limiting example the thermal expansion joint includes a bottom portion extending between a support structure and a trailing edge and the support structure is positioned proximate to a heat source. Furthermore, the thermal expansion joint includes a side portion. In some embodiments, the thermal expansion joint includes an overlapping portion coupled to the bottom portion and extending from a flange portion towards the side portion. Moreover, the overlapping portion overlays and is biased against the side portion to enable thermal expansion during heating by extending towards the heat shield flange and sliding along a top surface of the side portion.

In accordance with another aspect of the present disclosure, a thermal expansion joint is disclosed. In one non-limiting example the thermal expansion joint includes a bottom portion extending between a support structure and a trailing edge. In some embodiments, the support structure is positioned proximate to a heat source. The thermal expansion joint further includes a side portion extending from a flange portion. Furthermore, in one non-limiting example the thermal expansion joint includes an overlapping portion positioned along the flange portion and on top of the side portion. Moreover, the overlapping portion is coupled to the side portion and the bottom portion to enable thermal expansion during heating by allowing the overlapping portion and the bottom portion to slide along the side portion.

In accordance with yet another aspect of the present disclosure, a machine including a thermal expansion joint is disclosed. In some embodiments, the thermal expansion joint of the machine includes a bottom portion which extends between a support structure and a trailing edge. The support structure is positioned proximate to a heat source of the machine. The thermal expansion joint of the machine further includes a side portion and an overlapping portion. In one non-limiting example, the overlapping portion extends from a flange portion and is coupled to the bottom portion and the side portion to accommodate thermal expansion during heating.

The features, functions, and advantages disclosed herein can be achieved independently in various embodiments or may be combined in yet other embodiments, the details of which may be better appreciated with reference to the following description and drawings.

BRIEF DESCRIPTION OF THE DRAWINGS

FIG. 2 is an exploded perspective view of an exemplary heat shield assembly in accordance with an embodiment of the present disclosure;

FIG. 3 is an exploded perspective view of an exemplary heat shield assembly in accordance with an embodiment of the present disclosure;

FIG. 4 is a sectional view of an exemplary expansion joint in accordance with an embodiment the present disclosure;

FIG. 5 is a sectional view of an exemplary expansion joint in accordance with an embodiment the present disclosure;

FIG. 10 is a perspective view of a top surface of the overlapping strap in accordance with an embodiment of the present disclosure; and FIG. 11 is a perspective view of a bottom surface of the overlapping strap in accordance with an embodiment of the present disclosure.

It should be understood that the drawings are not necessarily to scale, and that the disclosed embodiments are illustrated diagrammatically, schematically, and in some cases in partial views. In certain instances, details which are not necessary for an understanding of the disclosed methods and apparatuses or which render other details difficult to perceive may have been omitted. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

Figure 1:
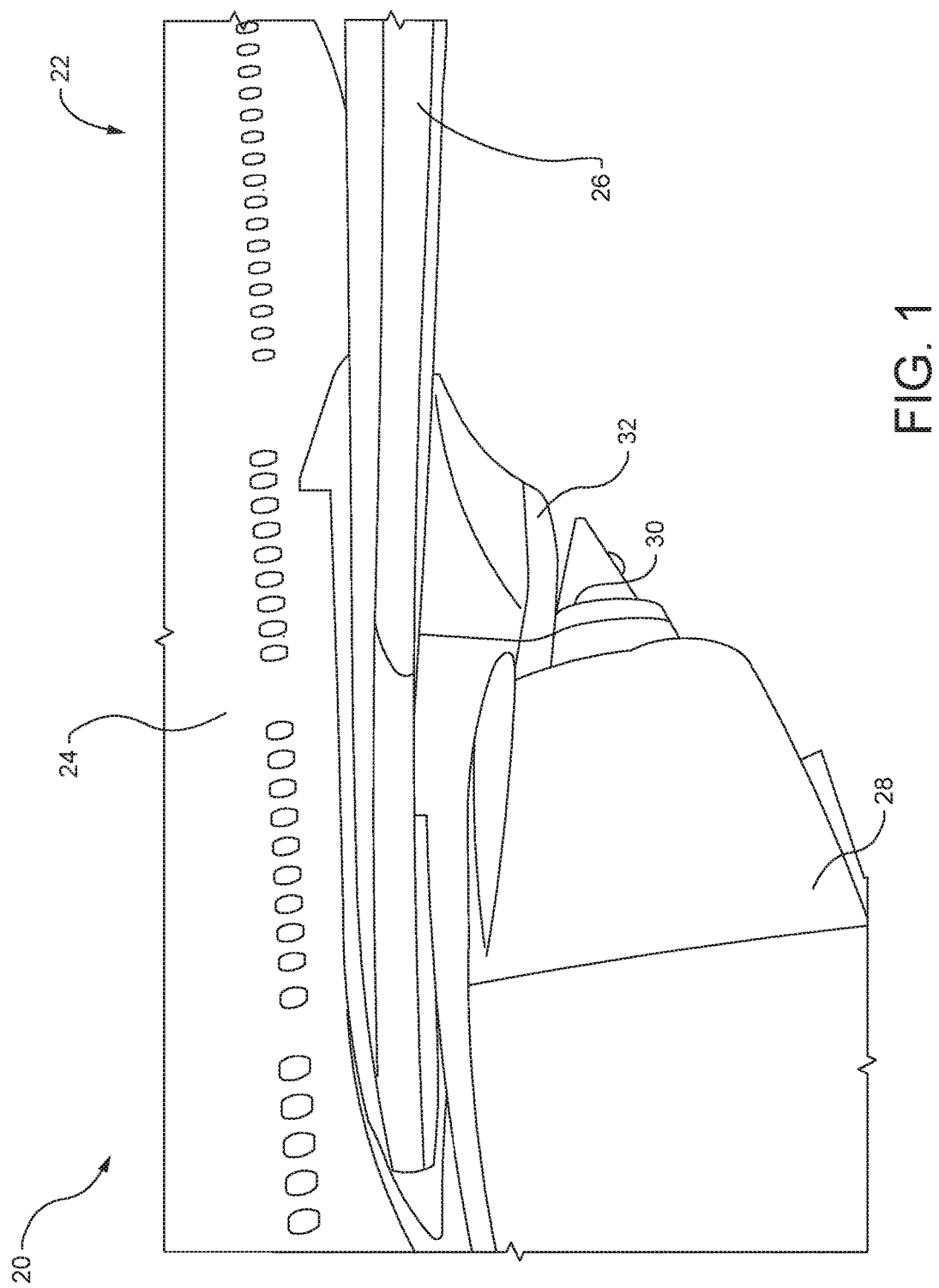
FIG. 1 is a perspective view of an exemplary vehicle constructed in accordance with the present disclosure.

In FIG. 1, a vehicle 20 is illustrated. One non-limiting example of the vehicle 20 is that of an aircraft, however it will be appreciated that the present disclosure applies to other types of vehicles and machines as well, such as but not limited to, marine vessels, construction equipment, and power generators. In some embodiments, the vehicle 20, or aircraft, is configured with an airframe 22, which includes a fuselage 24, wings 26, and other such components. In one non-limiting example, one or more propulsion units 28 are coupled to each wing 26 in order to propel the vehicle 20 in a direction of travel. Furthermore, each wing 26 is fixedly attached to the fuselage 24 and the one or more propulsion units 28 are attached to an underside surface of the wing 26, however other attachment locations and configurations of the propulsion units 28 are possible. In one non-limiting example, each wing 26 is attached at a substantially centered position along the fuselage 24 and are swept back towards the rear or aft portion of the vehicle 20. Moreover, in some embodiments, the one or more propulsion units 28 generate thrust and a heat plume during operation. The thrust is generally directed through a nozzle portion 30 of the propulsion unit 28 and expelled towards the aft portion of the vehicle 20. In one non-limiting example, the heat plume expelled from the one or more propulsion units 28 flows across portions of the airframe 22, such as a heat shield assembly 32, the fuselage 24, and other such assemblies. As a result, in some embodiments, the airframe 22, the heat shield assembly 32, and other assemblies are configured such that they are capable of withstanding a variety of environmental conditions, such as extreme temperature variation, high and/or low humidity, vibration, airborne debris, and other such conditions encountered during operation.

Moving on to FIGS. 2-3, an embodiment of the heat shield assembly 32 incorporating an expansion joint 34 is illustrated. In some embodiments, the expansion joint 34 is configured as a thermal expansion joint which allows for the expansion and contraction of the heat shield assembly 32 along the expansion joint 34 as the temperature of the heat shield assembly 32 increases and/or decreases. In one non-limiting example, the heat shield assembly 32 includes a bottom skin 36, and one or more side skins 38, with the side skins 38 separated by one or more support structures 40. Furthermore, in some embodiments, the bottom skin 36, the side skin 38, and other components of the heat shield assembly 32 are fabricated out of titanium, titanium alloy, composite, or other such material. Moreover, during manufacture of the heat shield assembly 32, the bottom skin 36 and the side skin 38 are orientated such that the bottom skin 36 and the side skin converge to form the expansion joint 34. In one non-limiting example, an overlapping strap 42 is incorporated into the expansion joint 34 such that the overlapping strap 42 is positioned adjacent to and/or overlapping with the bottom skin 36 and side skin 38. Additionally, in some embodiments, the overlapping strap 42 is coupled with the bottom skin 36 and side skin 38. Moreover, similar to the bottom skin 36 and the side skin 38, the overlapping strap 42 is fabricated out of titanium, titanium alloy, composite, or other such material.

As further illustrated in FIGS. 2-3, an embodiment of the heat shield assembly 32 incorporates one or more of wear surfaces along the expansion joint 34. For example, the bottom skin 36 has a bottom skin wear surface 44 which runs along at least a portion the bottom skin 36, the side skin 38 has a side skin wear surface 48 which runs along at least a portion of the side skin 38 that is proximate to the bottom skin 36, and the overlapping strap 42 has an overlapping strap wear surface 50 which runs along a surface of the overlapping strap 42 and opposes or contacts the bottom skin 36 and/or the side skin 38. In some embodiments, the wear surfaces help to facilitate sliding or other movements of the bottom skin 36, the side skin 38, and the overlapping strap 42, which occur during expansion and contraction of the heat shield assembly 32. Furthermore, in one exemplary embodiment, the bottom skin wear surface 44, the side skin wear surface 48, and the overlapping strap wear surface 50 are composed of a layer of wear tolerant material that is applied to the appropriate wear surfaces 44, 48, 50, such as but not limited to, tungsten carbide, chromium carbide, or other alloys, ceramics, and other materials having suitable wear characteristics. Moreover, in some embodiments, the wear surfaces 44, 48, 50 are formed using a thermal spray coating process which deposits the wear tolerant material on the portions of bottom skin 36, side skin 38, and overlapping strap 42, where sliding or other movement is most likely to occur. However, other methods of the application and distribution of the wear tolerant material on the wear surfaces 44, 48, 50 are possible. In one non-limiting example, the thermal spray coating process refers to a deposition method where the wear tolerant material is first heated or melted such that the material is spray deposited onto the wear surfaces 44, 48, 50 and/or other surfaces that require wear protection. However, other methods for depositing the wear tolerant material, such as electrodeposition, chemical vapor deposition, evaporation, sputtering, and other known deposition methods are possible.

Figure 6:
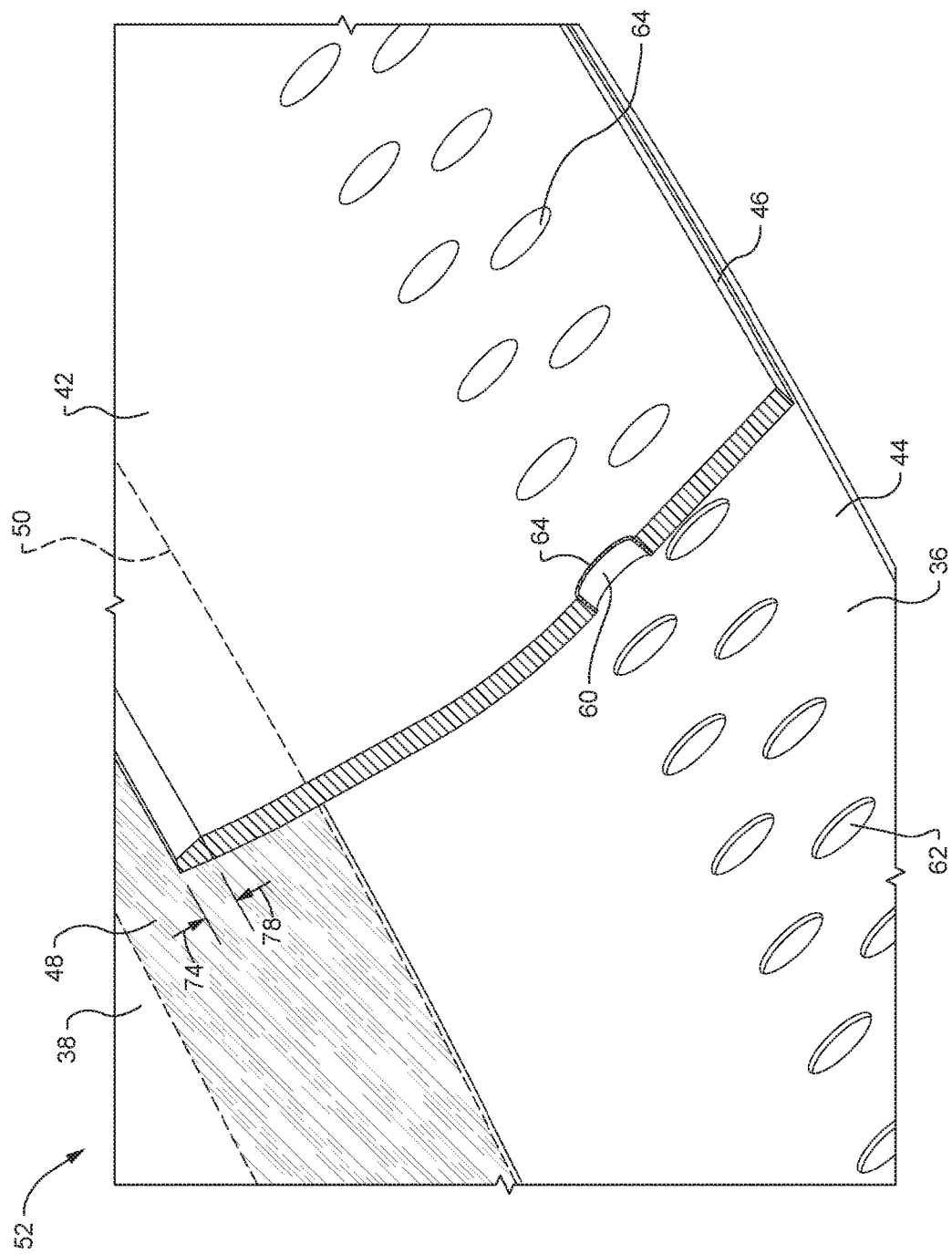
FIG. 6 is a perspective view of an exemplary expansion joint in a contracted position in accordance with an embodiment the present disclosure.
Figure 7:
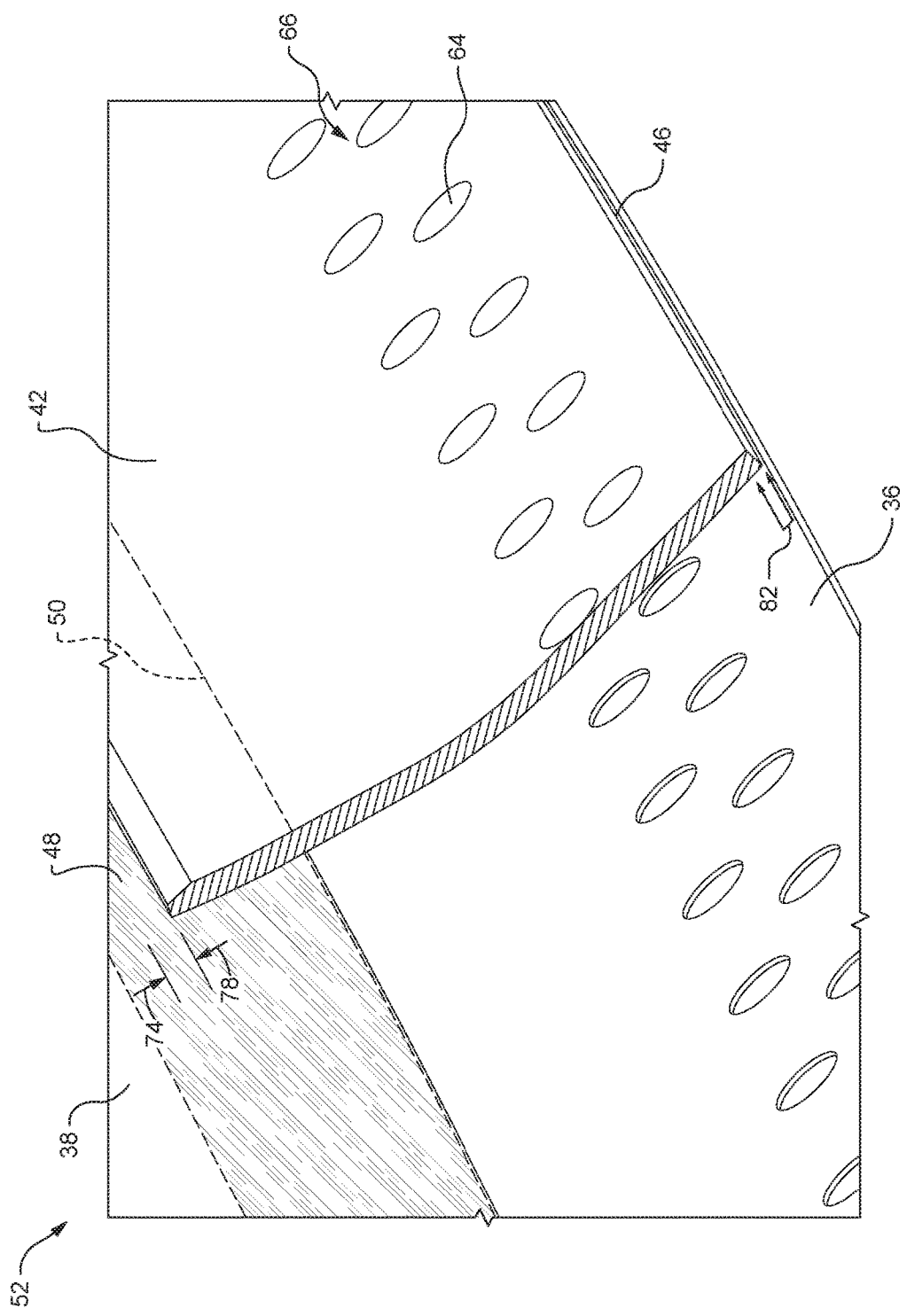
FIG. 7 is a perspective view of an exemplary expansion joint in an extended position in accordance with an embodiment of the present disclosure.

Moving on to FIGS. 4 and 6-7, an embodiment of the expansion joint 34 is illustrated. In one non-limiting example, the expansion joint 34 is formed such that the bottom skin 36, the side skin 38, and the overlapping strap 42 interact with one another to form a sliding joint 52 along the expansion joint 34. In one embodiment, the bottom skin 36 and side skin 38 are positioned in close proximity with each other, but do not directly contact one another, and the bottom skin 36 extends from the support structure 40 (FIGS. 2-3) to the trailing edge 47 of the heat shield assembly 32. Furthermore, the overlapping strap 42 is positioned such that a bottom surface 54 of the overlapping strap 42 is substantially in contact with a bottom skin top surface 56, and the overlapping strap 42 and the bottom skin 36 are aligned with one another along the heat shield flange 46 of the heat shield assembly 32. Moreover, the overlapping strap 42 has at least one overlapping strap aperture 60 and the bottom skin has at least one bottom skin aperture 62 and the overlapping strap and bottom skin apertures 60, 62 are aligned with one another. In one non-limiting example, a fastening device 64, such as but not limited to a rivet, is inserted into the overlapping strap and bottom skin apertures 60, 62 thereby fixedly coupling the overlapping strap 42 to the bottom skin 36 along the heat shield flange 46 of the heat shield assembly 32. In an embodiment, one or more fastening devices 64 forms a compression shear joint between the overlapping strap 42 and the bottom skin 36 along the heat shield flange 46, however other joints are possible.

Furthermore in one exemplary embodiment, the overlapping strap 42 extends from the heat shield flange 46 towards the side skin 38, and at least a portion of the overlapping strap 42 is overlappingly engaged with at least a portion of the side skin 38 to form the sliding joint 52 along the expansion joint 34. Moreover, in an embodiment, the overlapping strap 42 is pre-formed such that the overlapping strap 42 is compressed against the side skin top surface 58, thereby forming a substantially fluid tight seal 68 between the overlapping strap 42 and the side skin 38. In some embodiments, the heat shield assembly 32 has an insulation blanket 70 or other heat protective material which is placed within an internal portion 72 of the heat shield assembly 32. In some embodiments, the insulation blanket 70 is sensitive to environmental conditions, and as a result the fluid tight seal 68 is configured to keep moisture, hot gasses, particles, and other contaminants from entering the internal portion 72 of the heat shield assembly 32. In some embodiments, the pre-forming of the overlapping strap 42 and the compression of the overlapping strap 42 against the side skin 38 is sufficient to create the fluid tight seal 68. Alternatively or additionally, a sealing element, such as but not limited to a temperature tolerant gasket, is positioned between the overlapping strap 42 and the side skin 38 to help form and maintain the fluid tight seal 68.

FIGS. 6 and 7 respectively illustrate the expansion joint 34 in the cold or contracted position 74 and the hot or expanded position 78. In one non-limiting example, the expansion joint 34 is configured as the sliding joint 52 and the overlapping strap 42 is fixedly coupled to the bottom skin 36 by one or more fastening devices 64. Furthermore, the overlapping strap 42 and the bottom skin 36 are aligned with one another along the heat shield flange 46 of the heat shield assembly 32. The overlapping strap 42 extends from the heat shield flange 46 towards the side skin 38. In some embodiments, the overlapping strap 42 overlaps with and is in contact with the side skin 38. Furthermore, in some embodiments, the overlapping strap bottom surface 54 includes the overlapping strap wear surface 50 and the side skin top surface 58 includes the side skin wear surface 48. Moreover, as illustrated in FIG. 6, when the expansion joint 34 is in the cold or contracted state the overlapping strap 42 is in contact with the side skin 38 at a cold or contracted position 74. In one embodiment, the side skin wear surface 48 and the overlapping skin wear surface 50 are oppositely facing and in contact with each other. In some embodiments, during thermal expansion the side skin wear surface 48 and the overlapping skin wear surface 50 slide or move against one another according to the expansion and/or contraction of the bottom skin 36 caused by a heating and/or cooling of the heat shield assembly 32.

FIG. 7 illustrates one example of the of the expansion joint 34 in the hot or expanded position 78 where the overlapping strap 42 slides or moves along the side skin wear surface 48 from the cold or contracted position 74 to the hot or expanded position 78. In one non-limiting example, the sliding or other movement of the overlapping strap 42 is caused by an expansion, elongation, or other deformation of the bottom skin 36 of the heat shield assembly 32. For example, when the heat shield assembly 32 is exposed to an environmental change, such as but not limited to, a change in temperature, the bottom skin 36 expands and/or contracts a specified length 82. Furthermore, in some embodiments of the sliding joint 52, the overlapping strap 42 is fixedly coupled to the bottom skin 36 by one or more fastening devices 64. As a result of such attachment, the overlapping strap 42 slides or otherwise moves along the side skin top surface 58. In one non-limiting example the sliding or other movement of the overlapping strap 42 is aided by the overlapping strap wear surface 50 contacting the side skin wear surface 48. As a result, the overlapping strap 42 is able to slide along the side skin top surface 58 as the bottom skin 36 expands and/or contracts the specified length 82. Moreover, in some embodiments, the use of the sliding joint 52 configuration allows the bottom skin 36 to expand and contract independently from the side skin 38.

Figure 8:
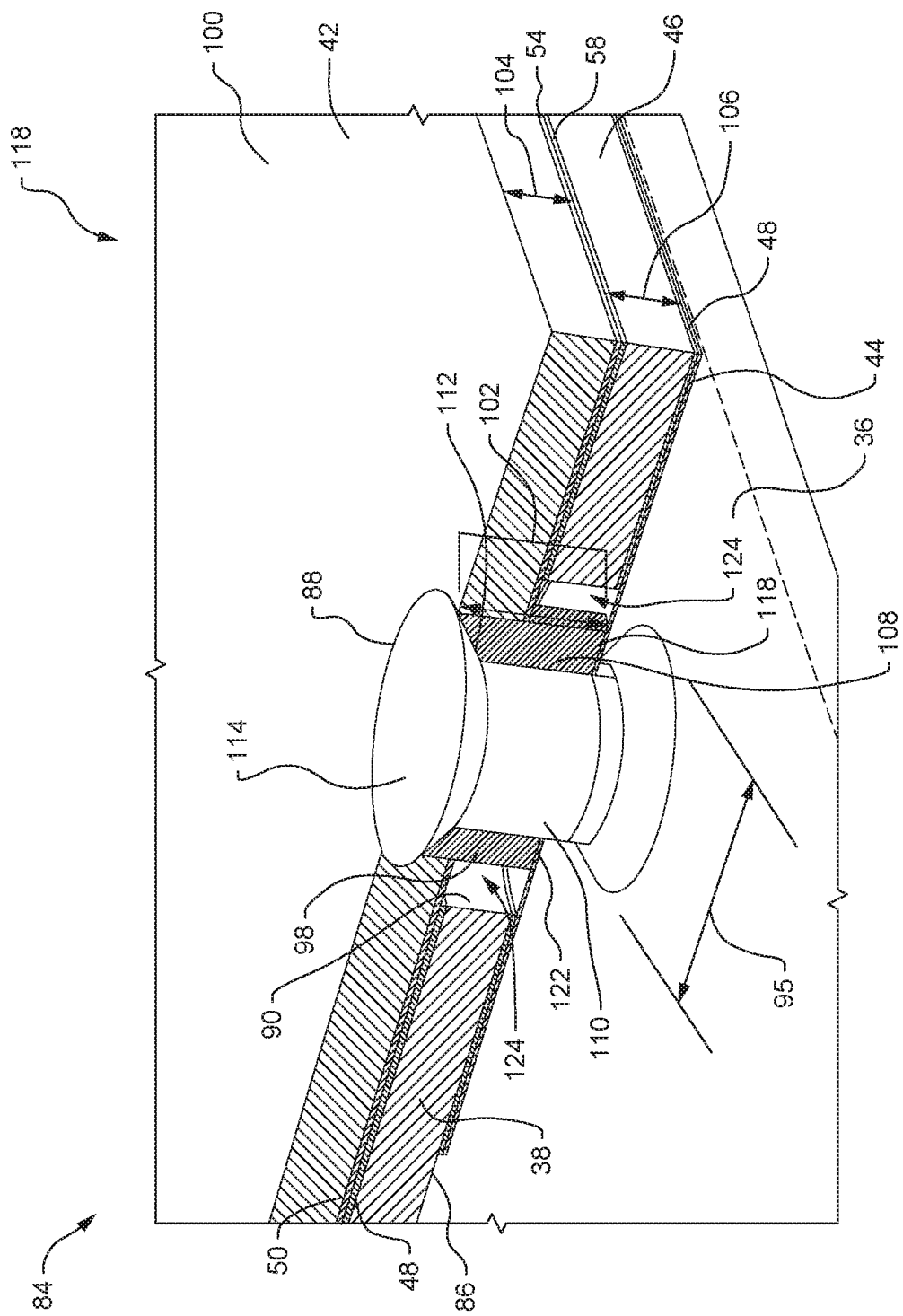
FIG. 8 is a perspective view of another exemplary expansion joint in the contracted position in accordance with an embodiment of the present disclosure.
Figure 9:
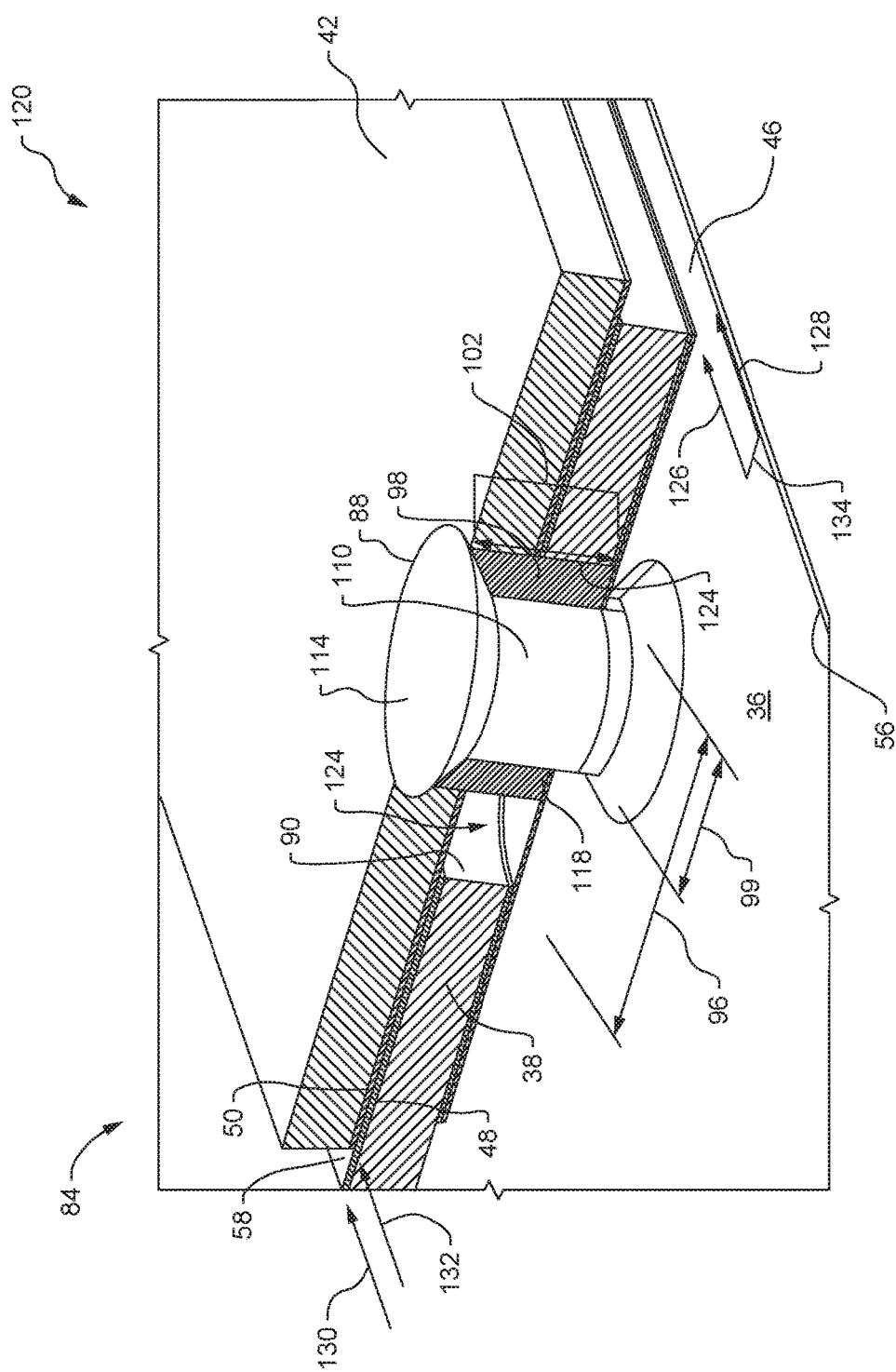
FIG. 9 is a perspective view of another exemplary expansion joint in the expanded position in accordance with an embodiment of the present disclosure.

Referring to FIGS. 5 and 8-9, an additional embodiment of the expansion joint 34 is illustrated. In one non-limiting example, the expansion joint 34 is formed such that the bottom skin 36, the side skin 38, and the overlapping strap 42 interact with one another to form a trapped sliding joint 84. In one embodiment, the bottom skin 36, the side skin 38 and the overlapping strap 42 are positioned in close proximity with each other, and aligned along the heat shield flange 46 of the heat shield assembly 32. Furthermore, the overlapping strap 42, the side skin 38, and the bottom skin 36 are arranged along the heat shield flange 46 in a stacked configuration such that the overlapping strap bottom surface 54 contacts at least a portion of the side skin top surface 58, and at least a portion of the side skin bottom surface 86 contacts at least a portion of the bottom skin top surface 56. Moreover, the overlapping strap 42 has at least one overlapping strap aperture 88, the side skin 38 has at least one side skin aperture 90, and the bottom skin has at least one bottom skin aperture 92. In some embodiments, the overlapping strap aperture 88, the side skin aperture 90, and the bottom skin aperture 92 are aligned with one another. In one non-limiting example, the overlapping strap aperture 88 has a strap aperture diameter 94, the bottom skin aperture 92 has a bottom skin aperture diameter 95, and the side skin aperture 90 has a side skin aperture diameter 96. In some embodiments, the side skin aperture diameter 96 is larger than the strap aperture diameter 94 and the bottom skin aperture diameter 95.

Furthermore, FIGS. 10-11 provide an illustration of the overlapping strap 42 with a plug 98 inserted into the overlapping strap aperture 88. In one non-limiting example, the plug 98 has a plug outer diameter 99 sized, at least in part, according to the strap aperture diameter 94, such that the plug 98 is tightly held within the overlapping strap aperture 88. Furthermore, the plug 98 is configured with a plug inner diameter 101. In some embodiments, the plug 98 is fabricated from titanium, titanium alloy, a composite, or other suitable material. Furthermore, the plug 98 may have a wear coating applied such as but not limited to, tungsten carbide or chromium carbide. In one non-limiting example, the wear coating is applied through a thermal spray coating process, however other application or deposition methods are possible.

In some embodiments, the plug 98 is inserted through the overlapping strap aperture 88 and extends from a top surface 100 of the overlapping strap 42 beyond the bottom surface 54 of the overlapping strap 42. In one non-limiting example, the plug 98 has a height 102 which is measured from the overlapping strap bottom surface 54. As illustrated in FIGS. 8-9, in some embodiments, the plug height 102 is configured to approximately equal a first thickness 104 plus a second thickness 106. The first thickness 104 is composed of the overlapping strap 42 thickness plus the overlapping strap wear surface 50 thickness on the overlapping strap bottom surface 54. The second thickness 106 is composed of the thickness of the side skin 38 plus the thickness of the side skin wear surface 48 on both the side skin top surface 58 and the side skin bottom surface 86. As further illustrated in FIGS. 10 and 11, since the plug 98 is inserted into, and at least partially fills in, the overlapping strap aperture 88, the plug 98 includes an aperture 108 which is defined by the inner diameter 101 of the plug 98. Moreover, the aperture 108 extends through the plug 98 and is configured to accept a fastening device 110 (FIG. 8). Furthermore, in some embodiments, the plug 98, has a recessed top surface 112 surrounding the plug aperture 108, and the recessed top surface 112 is configured to mate with the fastening device 110 such that the top surface 114 of the fastening device 110 sits substantially planar or flush with the overlapping strap top surface 100 when the fastening device 110 is inserted into the plug aperture 108 and recessed top surface 112. In one non-limiting example, the fastening device 110, is a fastener, such as but not limited to a rivet, and the fastening device 110 is inserted into the plug aperture 108 such that the fastening device top surface 114 is positioned to be substantially planar to the overlapping strap top surface 100.

As further illustrated in FIGS. 8 and 10-11, in some embodiments, the overlapping strap 42, the side skin 38, and the bottom skin 36 are aligned such that the plug 98 extends downward through the side skin aperture 90, and the fastening device 110 is inserted into the plug aperture 108 and extends down through the bottom skin aperture 92. As a result, the fastening device 110 extends downward from the recessed top surface 112 through the bottom skin aperture 92 (FIG. 5), thereby coupling the overlapping strap 42, the side skin 38, and the bottom skin 36 together along the heat shield flange 46 of the heat shield assembly 32. In an embodiment, the fastening device 110 forms a compression shear joint between the overlapping strap 42, the side skin 38 and the bottom skin 36, however other joints are possible. Furthermore in one exemplary embodiment, the overlapping strap 42 is in contact with the side skin top surface 58, and a portion of side skin bottom surface 86 is in contact with a portion of the bottom skin top surface 56 to form the trapped sliding joint 84.

In some embodiments, the overlapping strap 42 is coupled to the side skin top surface 58, and at least a portion of the side skin bottom surface 86 is coupled to, at least a portion, of the bottom skin top surface 56, thereby forming a substantially fluid tight seal 116 between the overlapping strap 42, the side skin 38, and the bottom skin 36. As illustrated in FIG. 5, some embodiments of the heat shield assembly 32 include an insulation blanket 70 or other heat protective material which is placed within an internal portion 72 of the heat shield assembly 32. In some embodiments, the insulation blanket 70 is sensitive to environmental conditions, and as a result, the fluid tight seal 116 is configured to keep moisture, hot gasses, and other such contaminants from entering the internal portion 72 of the heat shield assembly 32. In one non-limiting example, the compression provided by the fastening device 110 is sufficient to create the substantially fluid tight seal 116 between the overlapping strap 42, the side skin 38, and the bottom skin 36. Alternatively or additionally, a sealing element, such as but not limited to a gasket, is positioned between the overlapping strap 42 and the side skin 38 and between the side skin 38 and the bottom skin 36 to help form the fluid tight seal 116.

Further, FIGS. 8 and 9 respectively illustrate an exemplary embodiment of the expansion joint 34 in a cold/ contracted position 118 and in a hot/expanded position 120. In one non-limiting example, the expansion joint 34 is configured such that at least portions of the overlapping strap 42, the side skin 38, and the bottom skin 36 are aligned along the heat shield flange 46 and fixedly attached or otherwise coupled to one another by one or more fastening devices 110. In some embodiments, the overlapping strap 42 is positioned on top and in contact or otherwise coupled with the side skin 38. Furthermore, in an embodiment, the overlapping strap bottom surface 54 includes the overlapping strap wear surface 50 and the side skin top surface 58 includes the side skin wear surface 48, and the opposing overlapping strap wear surface 50 and side skin wear surface 48 are in contact with each other. Additionally, in some embodiments, at least a portion of the side skin 38 is positioned on top of and in contact with a portion of the bottom skin 36. Moreover, at least a portion of the side skin bottom surface 86 has a side skin wear surface 48 and at least a portion of the bottom skin top surface 56 has a bottom skin wear surface 44. In some embodiments, the overlapping wear surface 50, the side skin wear surface 48, and the bottom skin wear surface 44 is a layer of tungsten carbide, a layer of chromium carbide, or other such layer, which is applied to help minimize wear and facilitate movement between the overlapping strap 42, the side skin 38, and the bottom skin 36. In one non-limiting example, the wear surfaces 44, 48, 50 are deposited by a thermal spray coating process, however other application or deposition processes are possible.

In some embodiments, when the overlapping strap 42 is aligned with the side skin 38 and the bottom skin 36, the plug 98 extends through the overlapping strap aperture 88 and the side skin aperture 90, and a plug bottom surface 118 is positioned adjacent to the bottom skin top surface 56. In one non-limiting example, the plug bottom surface 118 is substantially in contact with the bottom skin top surface 56 and/or the bottom skin wear surface 44. Furthermore, in some embodiments, the plug bottom surface 118 includes a wear surface, such as but not limited to, tungsten carbide or chromium carbide. Alternatively, in some embodiments the plug 98 is constructed out of a wear tolerant material such as tungsten carbide, chromium carbide, or other such material. As illustrated in FIG. 8, in the cold or contracted position 118, the plug 98 extends downward through the oversized side skin aperture 90 and is substantially centered within the oversized side skin aperture 90, however other positions of the plug 98 within the side skin aperture 90 are possible. In one non-limiting example, the second diameter 96 (FIG. 5) of the side skin aperture 90 is sized such that a gap 124 is present on either side of the plug 98, the gap 124 being formed between the plug 98 and the side skin aperture 90. In some embodiments, when the plug 98 is substantially centered within the side skin aperture 90 the gap 124 on either side of the plug 98 will be substantially equal.

FIG. 9 illustrates one example of the of the expansion joint 34 in the hot or expanded position 120 where the trapped sliding joint 84 allows for the expansion or elongation of the heat shield assembly 32. In one non-limiting example, during thermal expansion, the bottom skin 36 expands from a first position 126 to a second position 128. In some embodiments, while in the first position 126, the bottom skin 36 is substantially flush and aligned with the overlapping strap 42 and the side skin 38 along the heat shield flange 46. However, in one exemplary embodiment, when the heat shield assembly 32 is exposed to an increased temperature the bottom skin 36 elongates and extends to the second position 128. Moreover, the trapped sliding joint 84 is configured such that as the bottom skin expands, the overlapping strap 42 will slide, or otherwise move, from a first position 130 to a second position 132. Furthermore, as the overlapping strap 42 slides from the first position 130 to the second position 132, the plug 98 also slides, or otherwise moves, within the side skin aperture 90. In some embodiments, the plug 98 moves within the side skin aperture 90 such that the gap 124 increases on one side of the plug 98 and decreases on the other side of the plug 98.

When the heat shield assembly 32 (FIGS. 2-3) including the trapped sliding joint 84 is exposed to an environmental change, such as but not limited to, a change in temperature, the bottom skin 36 expands and/or contracts a specified length 134. Furthermore, in some embodiments, the overlapping strap 42 is coupled to the bottom skin 36 by the fastening device 110 which is inserted through the overlapping strap aperture 88, the plug aperture 108, and the bottom skin aperture 92. Moreover, in some embodiments, the side skin 38 is positioned, or sandwiched, between the overlapping strap 42 and the bottom skin 36. Moreover, the plug 98 is inserted into the overlapping strap aperture 88 and extends through the side skin aperture 90, such that the plug bottom surface (FIG. 11) ends up adjacent to or in contact with the bottom skin top surface 56. In one non-limiting example, the diameter of the side skin aperture 96 is larger than the outer diameter of the plug 99 such that as the bottom skin 36 expands and contracts, the overlapping strap 42 slides along the side skin top surface 58 and the plug 98 slides along the bottom skin top surface 56 within the side skin aperture 90. As a result, during thermal expansion the trapped sliding joint 84 allows the bottom skin 36 to expand and contract independently from the side skin 38.

INDUSTRIAL APPLICABILITY

In general, the foregoing disclosure finds utility in various applications such as in transportation, mining, construction, industrial, and power generation machines and/or equipment. In particular, the disclosed expansion joint may be applied to vehicles such as airplanes, hauling machines, marine vessels, power generators, and the like.

For example, in some situations the heat shield assembly 32, including a bottom skin 36, a side skin 38 and an overlapping strap 42, is exposed to temperature variations, pressure variations, vibrations, and other such environmental conditions. As a result, an embodiment of the heat shield assembly 32 includes an expansion joint 34 which allows the heat shield assembly 32 to appropriately respond to the varying conditions encountered during operation. In one non-limiting example, the heat shield assembly 32 undergoes thermal expansion when exposed to an increase in temperature. As the heat shield assembly 32 heats up, the side skin 38, bottom skin 36, and overlapping strap 42 expand or elongate. Conversely, when the temperature surrounding the heat shield assembly 32 decreases, the heat shield assembly cools down and the side skin 38, bottom skin 36, and overlapping strap 42 contract or shrink. In some embodiments, the expansion joint 34 is configured such that the bottom skin 36 and the side skin 38 are allowed to expand and contract independently of one another.

This may be contrasted to alternative designs of heat shield assemblies where the bottom skin and side skin are fixedly attached to one another. In some cases, certain portions of the heat shield assembly heat up and/or cool down at different rates. For example, in one non-limiting example, as the heat shield assembly cools down the side skin cools quicker than the bottom skin. In the heat shield assembly where the side skin and bottom skin are fixedly attached to one another, the mismatched cooling rates between the side skin and the bottom skin imparts a compressive force on the bottom skin, which causes the bottom skin to buckle or otherwise become deformed as it cools. Moreover, in some situations, buckling or other deformations observed in the heat shield assembly create an increase in stress concentrations within the heat shield, that over time can impact the performance and/or reliability of the heat shield assembly. Furthermore, maintenance of such heat shield assemblies is labor intensive, which can increase the operation costs and extend the downtime of the vehicle or machine while under repair.

As such, some embodiments of the heat shield assembly 32 of the present disclosure incorporate an expansion joint 34 that would allow the heat shield assembly 32 to expand and contract without buckling or otherwise becoming deformed. In one non-limiting example, a sliding joint 52 is formed along the expansion joint 34 such that the overlapping strap 42 is coupled to the bottom skin 36 along the heat shield flange 46 of the heat shield assembly 32. Moreover, the overlapping strap 42 extends towards and overlaps the side skin 38. The overlapping strap 42, is biased against the side skin top surface 58 and allowed to slide or otherwise move along the side skin 38 as the bottom skin 36 expands and contracts. Such a configuration will allow the bottom skin 36 to expand and contract independently from the side skin 38 and minimize, or altogether eliminate, the buckling or other deformation of the heat shield assembly 32.

Additionally, in some embodiments, the overlapping strap 42, the side skin 38, and the bottom skin 36 are configured to form the trapped sliding joint 84 along the expansion joint 34 of the heat shield assembly 32. In one non-limiting example, the overlapping strap 42, the side skin 38, and the bottom skin are aligned and stacked on top of one another along the heat shield flange 46 of the heat shield assembly 32. Moreover, the trapped sliding joint 84 is configured such that as the bottom skin 36 expands and contracts, the overlapping strap 42 and bottom skin 36 slide or otherwise move along a portion of the side skin 38. As a result, the bottom skin 36 expands and contracts independently from the side skin 38 and therefore, minimize or altogether eliminate the buckling or other deformation of the heat shield assembly 32.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A thermal expansion joint, comprising:
   a bottom portion coupled to a support structure and extending between the support structure and a trailing edge, the support structure being proximate to a heat source;
   a side portion coupled to the support structure independent of the bottom portion, the side portion having a top surface defining a first wear surface; and
   an overlapping portion having a first end overlaying the bottom portion, the first end of the overlapping portion being coupled to the bottom portion to form a flange portion of the thermal expansion joint, the overlapping portion having a second end opposite and spaced from the first end and overlaying the side portion, a bottom surface of the overlapping portion at the second end defining a second wear surface oriented toward the first wear surface of the side portion, the overlapping portion being pre-formed so that the second end of the overlapping portion exerts a compression bias against the side portion thereby to form a fluid tight seal between the first wear surface and the second wear surface while permitting the second wear surface to slide relative to the first wear surface in response to thermal expansion of the bottom portion.

2. The thermal expansion joint of claim 1, further comprising at least one first aperture extending through the overlapping portion, at least one second aperture extending through the bottom portion, and at least one fastener being inserted into the first aperture and the second aperture to fixedly attach the overlapping portion to the bottom portion in a compression shear joint formed along the flange portion.

3. The thermal expansion joint of claim 1, wherein the first wear surface of the side portion and the second wear surface of the overlapping portion are each formed from a layer of thermal spray coating.

4. A thermal expansion joint, comprising:
a bottom portion coupled to a support structure and extending between the support structure and a trailing edge, the support structure being proximate to a heat source;
a side portion coupled to the support structure independent of the bottom portion, the side portion having a first end overlaying the bottom portion at a flange portion of the thermal expansion joint, the side portion further having a top surface defining a first wear surface spaced from the first end of the side portion; and
an overlapping portion having a first end overlaying the bottom portion and the first end of the side portion, the first end of the overlapping portion being coupled to the bottom portion at the flange portion of the thermal expansion joint, the overlapping portion having a second end opposite and spaced from the first end of the overlapping portion, a bottom surface of the overlapping portion defining a second wear surface aligned with and oriented toward the first wear surface of the side portion, wherein the second wear surface engages the first wear surface with a compression bias to form a fluid tight seal between the first wear surface and the second wear surface while permitting the second wear surface to slide relative to the first wear surface in response to thermal expansion of the bottom portion.

5. The thermal expansion joint of claim 4, further comprising at least one first aperture extending through the overlapping portion, at least one second aperture extending through the side portion and at least one third aperture extending through the bottom portion, and at least one fastener being inserted through the first aperture, the second aperture, and the third aperture to couple the overlapping portion, the side portion, and the bottom portion together along the flange portion in a compression shear joint.

6. The thermal expansion joint of claim 5, wherein a plug is disposed in the first aperture of the overlapping portion, the plug extending from the overlapping portion top surface, through the second aperture of the side portion, to a bottom portion top surface, and the plug including a plug aperture to accommodate the fastener.

7. The thermal expansion joint of claim 6, wherein the a diameter of the second aperture of the side portion is larger than a diameter of the plug.

8. The thermal expansion joint of claim 7, wherein a side portion bottom surface has a third wear surface which mates with a fourth wear surface on the bottom portion top surface.

9. The thermal expansion joint of claim 8, wherein the first wear surface, the second wear surface, the third wear surface, and the fourth wear surface are each formed from a layer of thermal spray coating, such that during thermal expansion the first wear surface slides against the second wear surface, and the third wear surface slides against the fourth wear surface.

10. An aircraft, comprising:
a wing;
a propulsion unit coupled to the wing;
a heat shield assembled coupled to the wing downstream of the propulsion unit, the heat shield assembly including:
a support structure;
a trailing edge spaced downstream of the support structure; and
a thermal expansion joint comprising:
a bottom portion coupled to the support structure and extending between the support structure and the trailing edge;
a side portion coupled to the support structure independent of the bottom portion, the side portion having a top surface defining a first wear surface; and
an overlapping portion having a first end overlaying the bottom portion, the first end of the overlapping portion being coupled to the bottom portion to form flange portion of the thermal expansion joint, the overlapping portion having a second end opposite and spaced from the first end and overlaying the side portion, a bottom surface of the overlapping portion at the second end defining a second wear surface oriented toward the first wear surface of the side portion, the overlapping portion being pre-formed so that the second end of the overlapping portion exerts a compression bias against the side portion thereby to form a fluid tight seal between the first wear surface and the second wear surface while permitting the second wear surface to slide relative to the first wear surface in response to thermal expansion of the bottom portion.

11. The aircraft of claim 10, further comprising at least one first aperture extending through the overlapping portion, at least one second aperture extending through the bottom portion, and at least one fastener being inserted into the first aperture and the second aperture to couple the overlapping portion to the bottom portion along the flange portion in a compression shear joint, such that as the bottom portion thermally expands, the overlapping portion extends towards the flange portion and slides along a side portion top surface to accommodate the thermal expansion.

12. The aircraft of claim 10, wherein both the overlapping portion and the bottom portion extend towards the flange portion and slide along the side portion during heating to accommodate thermal expansion.

13. The aircraft of claim 12, further comprising at least one first aperture extending through the overlapping portion, at least one second aperture extending through the side portion, and at least one third aperture extending through the bottom portion, and at least one fastener being inserted through the first aperture, the second aperture and the third aperture to fixedly attach the overlapping portion to the bottom portion along the flange portion in a compression shear joint.

14. The aircraft of claim 13, wherein a plug is disposed in the first aperture of the overlapping portion, the plug extending from the overlapping portion top surface, through the second aperture of the side portion, to the bottom surface top surface, and the plug including a plug aperture to accommodate the fastener.

15. The aircraft of claim 14, wherein a diameter of the second aperture of the side portion is larger than a diameter of the plug to accommodate thermal expansion of the bottom portion.

16. The aircraft of claim 12, wherein a side portion bottom surface has a third wear surface and the bottom portion top surface has a fourth wear surface.

17. The aircraft of claim 16, wherein the first wear surface, the second wear surface, the third wear surface, and the fourth wear surface are each formed from a layer of thermal spray coating.

* * * * *